March 4, 1924.

W. A. TURBAYNE 1,485,740

REVERSIBLE DOUBLE VOLTAGE GENERATOR AND SYSTEM INVOLVING SAME

Original Filed Nov. 17, 1917      4 Sheets-Sheet 1

Inventor

WILLIAM A. TURBAYNE.

Witnesses

By

Attorney

March 4, 1924.  
W. A. TURBAYNE  
1,485,740  
REVERSIBLE DOUBLE VOLTAGE GENERATOR AND SYSTEM INVOLVING SAME  
Original Filed Nov. 17, 1917  4 Sheets-Sheet 2

WITNESSES:

INVENTOR.  
WILLIAM A. TURBAYNE.  
BY  
ATTORNEY.

March 4, 1924.  
W. A. TURBAYNE  
1,485,740
REVERSIBLE DOUBLE VOLTAGE GENERATOR AND SYSTEM INVOLVING SAME
Original Filed Nov. 17, 1917     4 Sheets-Sheet 3
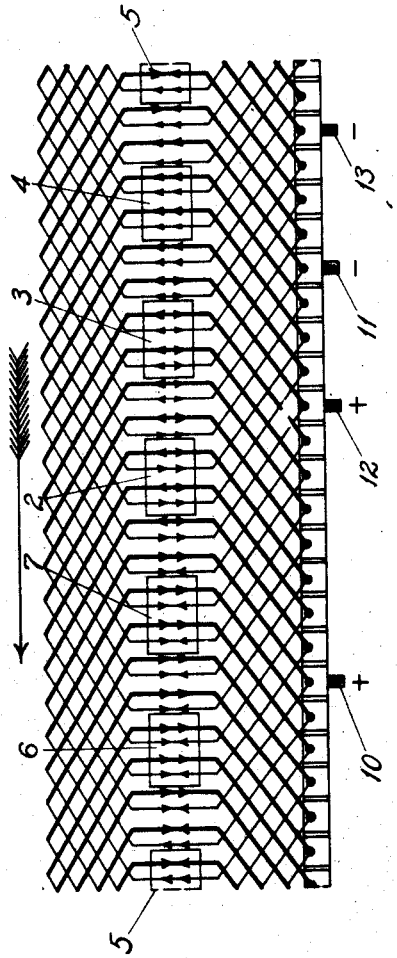
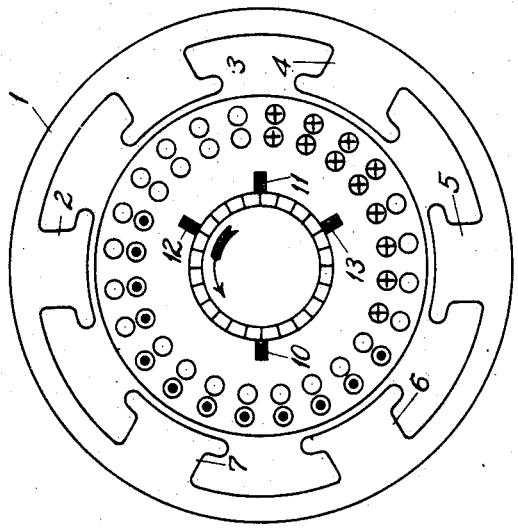
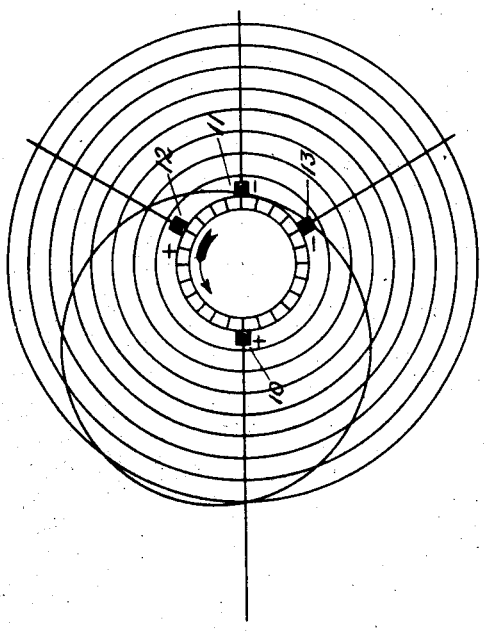
WITNESSES:
INVENTOR.
WILLIAM A. TURBAYNE.
BY
ATTORNEY.

March 4, 1924.

W. A. TURBAYNE 1,485,740

REVERSIBLE DOUBLE VOLTAGE GENERATOR AND SYSTEM INVOLVING SAME

Original Filed Nov. 17, 1917    4 Sheets-Sheet 4

Inventor
WILLIAM A. TURBAYNE.

Witnesses

By Raymond H. Van Kest

Attorney

Patented Mar. 4, 1924.

1,485,740

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

REVERSIBLE DOUBLE-VOLTAGE GENERATOR AND SYSTEM INVOLVING SAME.

Application filed November 17, 1917, Serial No. 202,442. Renewed November 19, 1923.

*To all whom it may concern:*

Be it known that I, WILLIAM A. TURBAYNE, a citizen of the United States, residing at Niagara Falls, in the county of Niagara and State of New York, have invented new and useful Improvements in Reversible Double-Voltage Generators and Systems Involving Same, of which the following is a specification.

The present invention relates to reversible double voltage generators and systems involving same.

An object is to provide a reversible generator which will inherently produce a constant polarity, regardless of the direction of rotation.

A further object is to provide a variable speed reversible generator which is adapted to supply a battery circuit and a translation circuit at different voltages and which will inherently develop a predetermined characteristic of regulation on each of these circuits.

A further object is to provide a system involving a translation circuit, a storage battery circuit and a generator cooperating in a novel way with said circuits.

Other objects will appear as the description proceeds.

Referring to the drawings:—

Figs. 3, 4 and 5 are schematic views illustrating the relative values and direction of the voltage and current in the armature of the machine illustrated in Fig. 1, during rotation in one direction.

Figure 1:
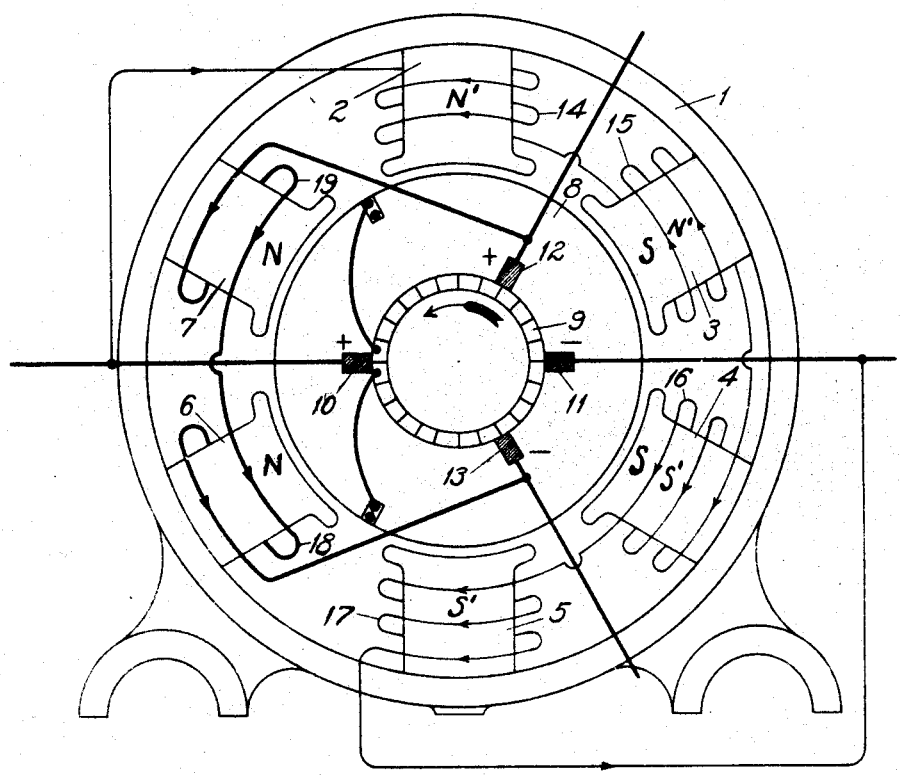
Fig. 1 is a diagrammatic view of a variable speed reversible generator according to the present invention.

Referring first to Fig. 1, the numeral 1 indicates a magnetic field frame provided with six pole pieces 2, 3, 4, 5, 6 and 7. Cooperating with the field poles is an armature 8 provided with a commutator 9. Said commutator 9 has contacting therewith a pair of brushes 10 and 11 and a second pair of brushes 12 and 13. In order that the description may be simplified, it will be assumed in the description that armature coils with symmetrical end connectors are provided, whereby the position of the brushes will indicate the location of the coils connected thereto. Each of the pole pieces 2, 3, 4 and 5 is provided with a field winding numbered 14, 15, 16 and 17 respectively. These field windings 14, 15, 16 and 17 are connected in series across brushes 10 and 11 and are wound to cause pole pieces 2 and 3 to be of one polarity, indicated by the characters N' and the poles 4 and 5 to be of the opposite polarity, indicated by the character S'. The windings 14, 15, 16 and 17 will therefore produce a field flux having a curved path having axes which lie mid-way between pole pieces 2 and 3 on the one hand and mid-way between pole pieces 4 and 5 on the other hand. Brushes 12 and 13 are located substantially in the axes of this field flux. Pole pieces 6 and 7 are provided with field windings 18 and 19 respectively, which are connected in series across brushes 12 and 13. Coils 18 and 19 are wound to produce poles of like polarity. This polarity will depend upon the relative polarity of brushes 12 and 13.

The armature should preferably be wound with coils having a pitch of substantially 120 degrees, for reasons which will appear hereinafter. Though the generator is shown as provided with six pole pieces, it in reality operates as a bipolar machine. It will be obvious that the number of magnetic circuits may be multiplied as desired, in which case the actual pitch of the armature winding must be correspondingly changed. Multiplication of the number of magnetic circuits will not change the principle of the machine which is herein illustrated and described in a simple form, so long as the magnetic and electrical relations between the various parts are maintained.

In explaining the operation of the generator illustrated in Fig. 1, we may first consider that the armature has a counter clockwise direction of rotation. As the armature conductors pass through the field of flux passing from poles 2 and 3 to poles 4 and 5, an E. M. F. will be set up across brushes 12 and 13. Inasmuch as windings 18 and 19 are connected to said brushes 12 and 13, current will flow through said windings to energize poles 6 and 7 with a polarity indicated as N. Furthermore, the current in the armature conductors will produce a M. M. F. in the right hand direction, aiding the flux from poles 6 and 7. There will therefore be produced a resultant field of flux, which for purposes of explanation may be resolved into two components, one of which threads the armature from pole pieces 2 and 3 to pole pieces 4 and 5 along axes spaced substantially 120 degrees apart, while the other component threads the armature horizontally along axes spaced 180 degrees apart. The horizontal component, passing from the pole pieces 6 and 7, will tend to make the pole pieces 3 and 4 of negative polarity, indicated by the character S. The 120 degree armature pitch above referred to has been found to be the pitch which will cooperate best with both flux components.

It will be obvious that if the direction of the armature rotation is reversed, the polarity of brushes 12 and 13 will be reversed, in which case the polarities of poles 6 and 7 will be reversed, as will also the M. M. F. produced by the current in the armature conductors. The horizontal flux component will thus be reversed, which will result in the advantage that with the reversal in the direction of armature rotation, the polarity of brushes 10 and 11 will be unchanged. Consequently, the polarity of the field windings 14, 15, 16 and 17 will be constant, no matter what the direction of armature rotation.

Figure 2:
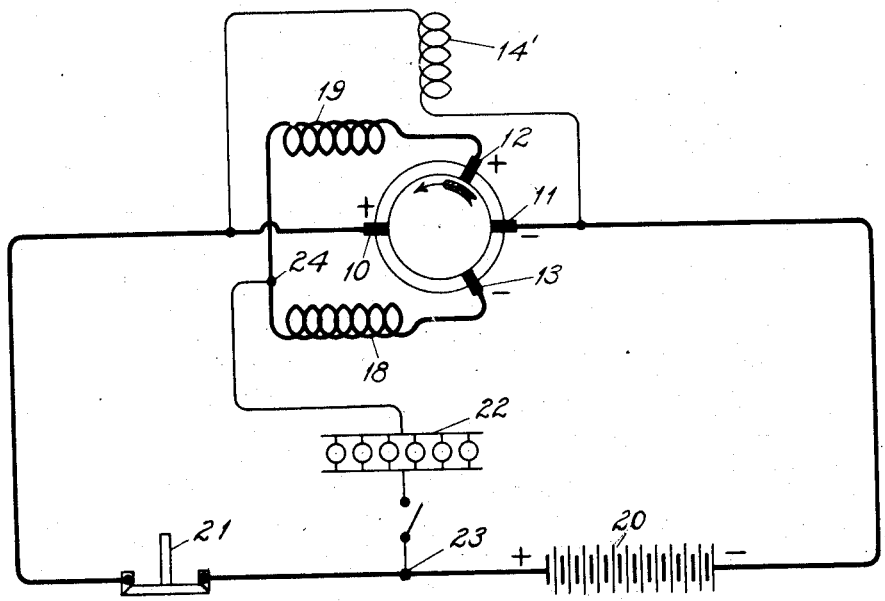
Fig. 2 illustrates a system employing the generator disclosed in Fig. 1.

Referring now to Fig. 2 wherein is illustrated a system employing a generator according to the present invention, the four field windings, 14, 15, 16 and 17 are illustrated for the sake of simplicity as a single winding indicated as 14'. Brush 10, which is indicated as positive, is connected to the positive terminal of the storage battery 20, through an automatic switch 21. The negative terminal of the storage battery is connected to the negative brush 11. The translation circuit 22 is connected on one side to the point 23 between the automatic switch 21 and the positive terminal of the storage battery 20 and on the other side to the point 24 between windings 18 and 19. As the generator speeds up, the voltage at the brushes 10 and 11 will rise until the automatic switch closes. Current will now flow from the positive brush 10 through automatic switch 21 and storage battery 20, back to the negative brush 11. If the translation circuit 22 is closed, current will be diverted at the point 23 and will pass through said translation circuit to the point 24. From the point 24 the current has two paths, but inasmuch as with the counter-clockwise direction of rotation indicated, the brush 13 will be negative, the current will pass through the winding 18 to said brush 13, supplementing the current flowing from the brush 12 through windings 19 and 18 to brush 13. As the current flowing between brushes 10 and 11 tends to increase, the magnetizing effect thereof will increase, which will be in a direction to oppose the flux component between poles 2—3 and poles 4—5. This magnetizing effect of the armature current between brushes 10 and 11 will therefore tend to hold the current output supplied from brushes 10 and 11 to a constant value. When the translation circuit 22 is closed and current flows from the brush 10 through said translation circuit and winding 18 to the brush 13, the added excitation of winding 18, together with the added M. M. F. due to the current flowing through the armature conductors between brushes 13 and 10, will have a compounding effect which will hold up the voltage across said translation circuit within certain limits of output. Upon reversal of direction of armature rotation, the polarity of brushes 12 and 13 will reverse, as explained above, and translation circuit current will return to the armature through winding 19. The regulating functions will be similar to those outlined for counter-clockwise rotation.

Figs. 3, 4 and 5 represent schematically the distribution of voltage and current around the armature after the automatic switch is closed, assuming that the armature has a counter-clockwise rotation. In Fig. 3, the upper arrows on the armature conductors represent direction of the current flowing between brushes 10 and 11, while the lower arrows represent the direction of the current flowing in the armature conductors between brushes 12 and 13. It will be noted in Fig. 3 that the exciting current in some of the conductors tends to oppose the main current. At a certain speed of rotation the resultant current may be zero. Therefore, for the sake of simplicity, those conductors in which currents tend to flow in opposite directions, are indicated as blank in Fig. 4. Those conductors in which the sum of the main and exciting currents flow are indicated by dots or crosses in Fig. 4, the crosses and dots being used conventionally to indicate the direction of current flow. Fig. 5 represents the distribution of E. M. F.'s around the armature, showing that a lower voltage is developed across brushes 10 and 12 than is developed across brushes 10 and 11.

Figure 7:
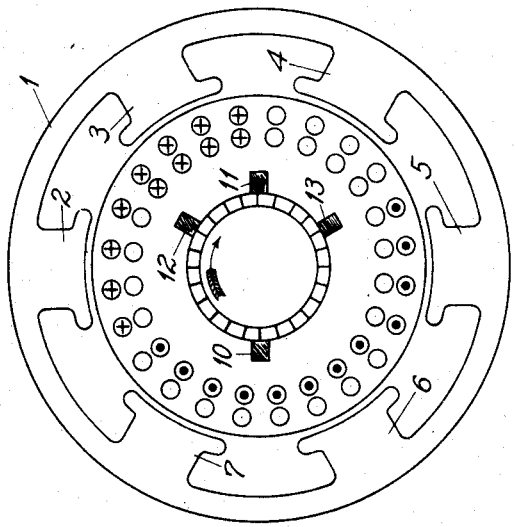
Figs. 6, 7 and 8 are schematic views, similar to Figs. 3, 4 and 5, but illustrating the conditions during rotation in the opposite direction.
Figure 6:
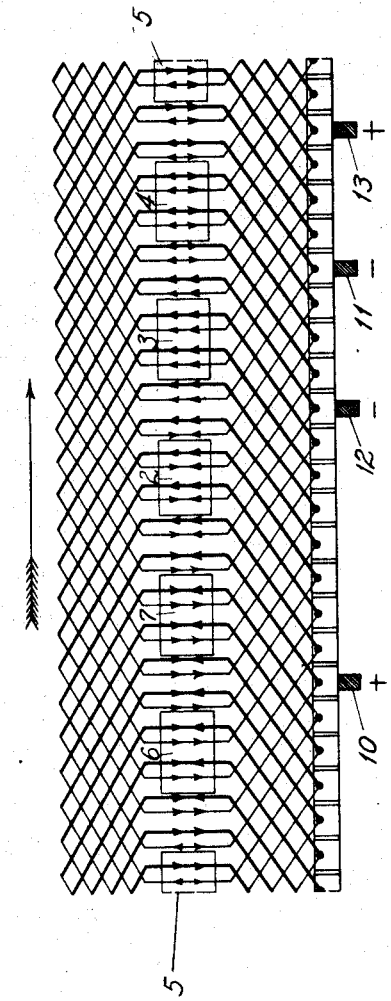
Figure 8:
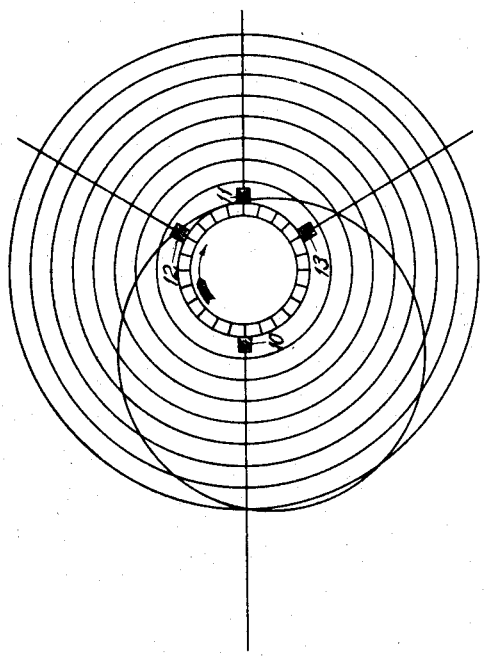

Figs. 6, 7 and 8 are analogous to Figs. 3, 4, 5, and indicates E. M. F.'s set up for a clockwise direction of armature rotation.

Figure 9:
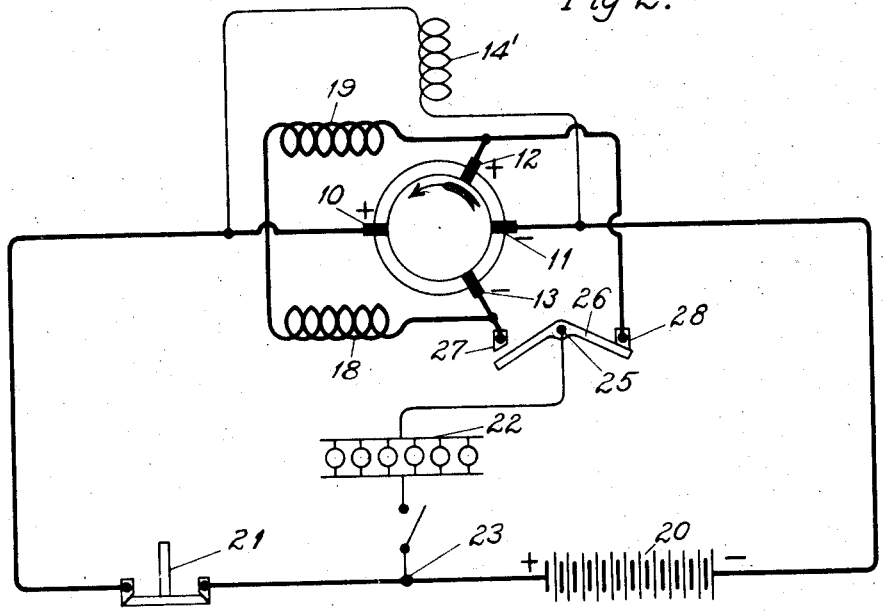
Fig. 9 represents a modification of Fig. 2.

Fig. 9 represents a modification of the arrangement illustrated in Fig. 2 whereby the result is accomplished that translation circuit current will be constrained to flow through both windings 19 and 18 instead of only one of said windings, as in Fig. 2. In Fig. 9, the return side of the translation circuit 22 is connected to the mid-point 25 of a rocking switch 26. Said rocking switch 26 is adapted to selectively contact with either contact 27 or contact 28. Contact 27 is connected to one end of the winding 18 and to the brush 13, while contact 28 is connected to one end of the winding 19 and to brush 12. Any preferred means may be provided for rocking the switch 26. It will be sufficient to state that said switch 26 should be rocked from one of its contacting positions to the other contacting position upon reversal of armature rotation. Said rocking may be accomplished mechanically or electrically, as preferred. In the position of the rocking switch illustrated in Fig. 9, translation circuit current will return through contact 28 and windings 19 and 18 to brush 13, whereby both windings 19 and 18 will be excited to hold up the horizontal field of flux. This, together with the added current flowing through armature conductors between brushes 13 and 10, will compensate for any drop in voltage in the armature conductors due to said added current and will hold up the voltage across brushes 12 and 13, whereby no diminution in the voltage across the translation circuit will occur with increases in load. If desired, the machine may be over-compounded. Any desired characteristic may be secured by suitably choosing the windings. Upon a reversal of armature rotation, the polarity of brushes 12 and 13 will change in the manner explained above. At the same time, the switch 26 will be rocked to a position to contact with contact 27, whereby the direction of current flow through windings 18 and 19 will be reversed. The voltage will be held up therefore, regardless of the direction of rotation of the armature.

Only simple representations of the various elements which go to make up the present invention have been illustrated and described. Various refinements and modifications are possible and will occur to those skilled in the art. It is desired that the patent shall cover all such refinements and modifications, so long as they include the fundamental principles of the invention as defined by the appended claims.

What I claim as new and desire to secure by Letters Patent of the United States is:—

1. In a dynamo-electric machine, in combination, an armature, means for setting up a field flux threading said armature along axes spaced $n$ degrees apart, brushes connected to said armature at points of maximum potential difference produced in said armature due to rotation in said field flux, and field windings connected to said brushes adapted to set up a field flux threading said armature along axes spaced more than $n$ degrees apart.

2. In a dynamo-electric maching, in combination, an armature having a winding pitch of substantially 120 degrees, a plurality of pole pieces co-operating with said armature, four of said pole pieces being provided with field windings to set up a flux threading said armature along axes spaced substantially 120 degrees apart, brushes connected to said armature at points of maximum potential difference due to rotation in said flux, the remainder of said pole pieces being placed symmetrically with said four pole pieces and being provided with field windings connected to said brushes.

3. In a dynamo electric machine, in combination, an armature, means for setting up field flux threading said armature along axes spaced less than 180 electrical degrees apart, said armature having a winding pitch of substantially the same angle, brushes located at the points of maximum potential difference, due to rotation in said flux, windings connected to said brushes adapted to set up a flux transverse to said first mentioned field of flux.

4. In a dynamo-electric machine, in combination, an armature, main brushes adapted to supply a relatively high voltage circuit and auxiliary brushes adapted to be connected to a relatively low voltage circuit, field windings connected to said main brushes and field windings connected to said auxiliary brushes, said low voltage circuit being connected between one of said main brushes and one of said auxiliary brushes through one of the field windings connected to said auxiliary brushes.

5. In a dynamo-electric machine, in combination, field windings operative in three sets, an armature and two sets of brushes, one set of said brushes being connected to said armature at points of maximum potential difference due to rotation in the flux produced by two of said sets of windings, said two sets of windings being connected across the other of said two sets of brushes, said third set of windings being connected across said one set of brushes.

6. In a dynamo-electric machine, in combination, an armature, a pair of brushes, means for inherently ensuring constant polarity of said brushes regardless of the direction of armature rotation including field windings connected across said brushes, a second pair of brushes whose polarity is responsive to the combined effect of the polarity of said field windings and the direction of armature rotation, and other field windings connected across said second set of brushes, the polarity of said first mentioned brushes being responsive to the combined effect of the polarity of said other field windings and direction of armature rotation.

7. In a dynamo-electric machine, in combination, an armature, windings for setting up a flux through said armature along axes spaced substantially 120 electrical degrees apart, said armature having a winding pitch of substantially 120 electrical degrees, brushes for collecting current from the armature conductors co-operating with said windings, other windings connected to said brushes, said other windings being adapted to aid the M. M. F. due to the current flowing in said armature conductors, other brushes connected to armature conductors spaced substantially 180 electrical degrees apart, said first mentioned windings being connected across said last mentioned brushes.

8. In a dynamo-electric machine, in combination, an armature, means for setting up field flux, means including field windings for distorting said flux in a direction depending upon the direction of armature rotation, a pair of brushes whose polarity is inherently responsive to said distortion, said field windings being connected across said brushes.

9. In a dynamo electric machine, in combination, an armature, field windings, other field windings for setting up a flux to distort the flux due to said first mentioned field windings, a pair of brushes whose relative polarity depends upon the direction of said distortion, said first mentioned field windings being connected across said brushes, main brushes connected to armature conductors directly affected by the flux from said first mentioned field windings, said other field windings being connected across said main brushes.

10. In combination, a dynamo-electric machine having field windings for setting up field flux, other windings for distorting said flux, an armature, two circuits connected to said armature to receive current therefrom, one of said circuits being connected to said first mentioned field windings to deliver current through said main field windings, said last mentioned circuit being connected to said armature at points whose polarity is inherently responsive to the direction of armature rotation.

11. In combination, a dynamo-electric machine having an armature, field windings for setting up field flux, field windings for distorting said flux in a direction depending upon the direction of armature rotation, a pair of brushes whose polarity is responsive to said distortion, said first mentioned field windings being connected across said brushes, an outside circuit, a second pair of brushes for supplying said outside circuit, and a second outside circuit connected between one of said first mentioned pair of brushes and one of said second mentioned pair of brushes.

12. In combination, a dynamo-electric machine having field windings whose polarity is inherently responsive to the direction of armature rotation, a pair of circuits supplied by said machine, one of said circuits being completed through said field windings.

13. In combination, a dynamo-electric machine having a pair of brushes and a field circuit connected thereto whose polarity is responsive to the direction of armature rotation, a second set of brushes placed at points where the combined effect of said field windings and the direction of armature rotation results in constancy of polarity, a storage battery circuit connected to said second set of brushes and a translation circuit connected between one of said second set of brushes through certain of said field windings to one of said first mentioned set of brushes.

14. In combination, a dynamo-electric machine having a field winding for producing constancy of polarity regardless of the direction of armature rotation, a storage battery circuit and a translation circuit supplied by said machine said translation circuit being completed through said field winding.

15. In combination, a dynamo-electric machine, a battery circuit and a translation circuit supplied by said machine, said dynamo-electric machine being provided with means having the dual function of ensuring constancy of polarity and directly responding to current variations in the translation circuit to sustain the voltage on said translation circuit.

16. In combination, a dynamo-electric machine, a battery circuit and a translation circuit supplied by said machine, said dynamo-electric machine being provided with a field winding having the dual function of ensuring constancy of polarity and varying the field excitation of said machine in response to the load on said translation circuit.

17. In combination, a dynamo-electric machine having a pair of brushes, a pair of auxiliary brushes, a field winding connected across said auxiliary brushes, a translation circuit connected between one of said first pair of brushes and a point in the field circuit between said auxiliary brushes whereby the current in said translation circuit flows through said field circuit in a direction to assist exciting current in said field winding.

18. In combination, a reversible dynamo-electric machine having a pair of brushes, a pair of auxiliary brushes, a field winding connected across said auxiliary brushes, a translation circuit connected between one of said first pair of brushes and a selectable point in the field circuit between said auxiliary brushes whereby current in said translation circuit flows through said field circuit in a direction to assist exciting current in said field winding, and means to automatically select a point of connection of said translation circuit to said field circuit with reversals in rotation of said dynamo-electric machine, whereby said translation circuit current is maintained at all times in a direction to assist said exciting current.

In witness whereof, I have hereunto subscribed my name.

WILLIAM A. TURBAYNE.